Patented Aug. 19, 1941

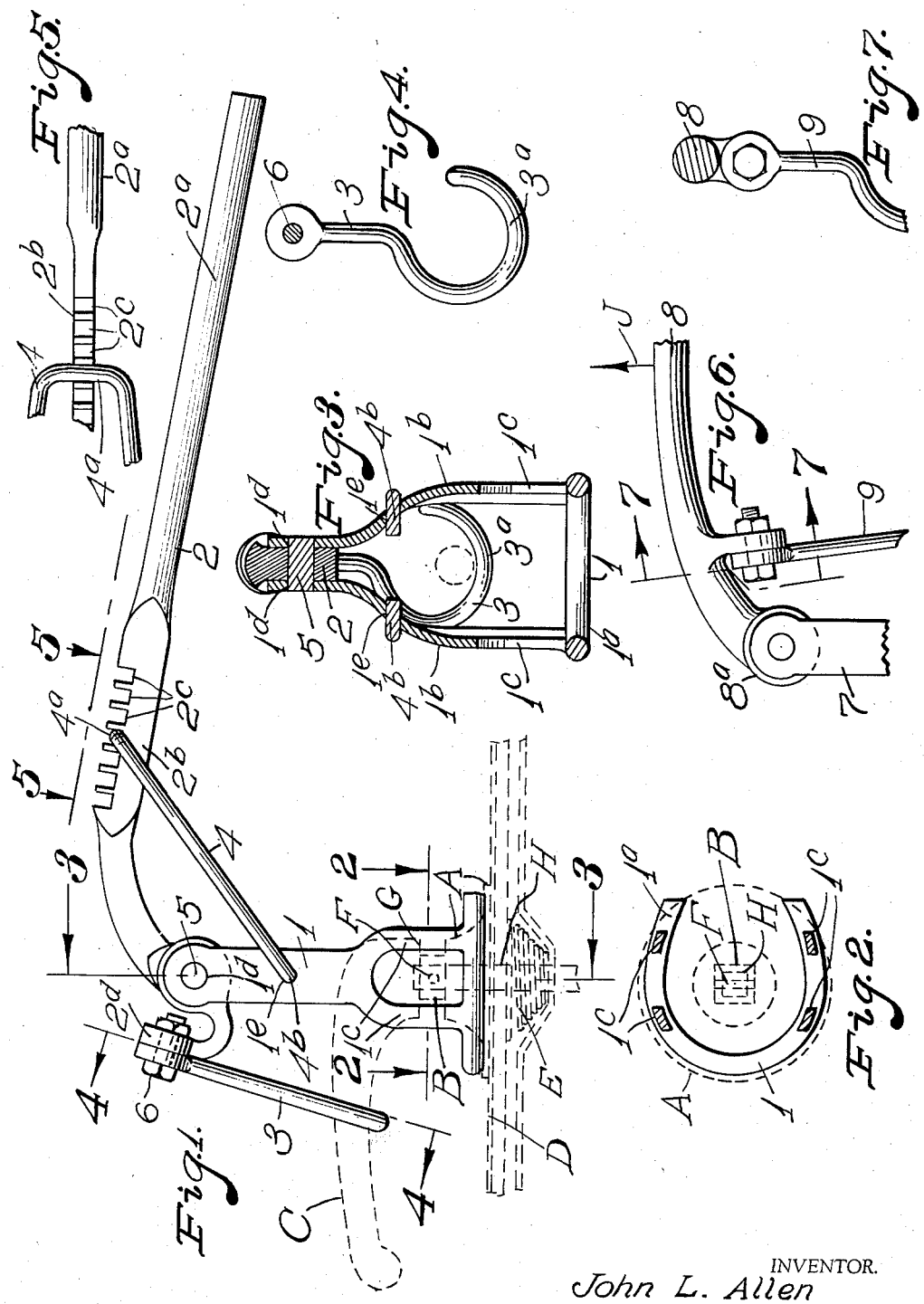

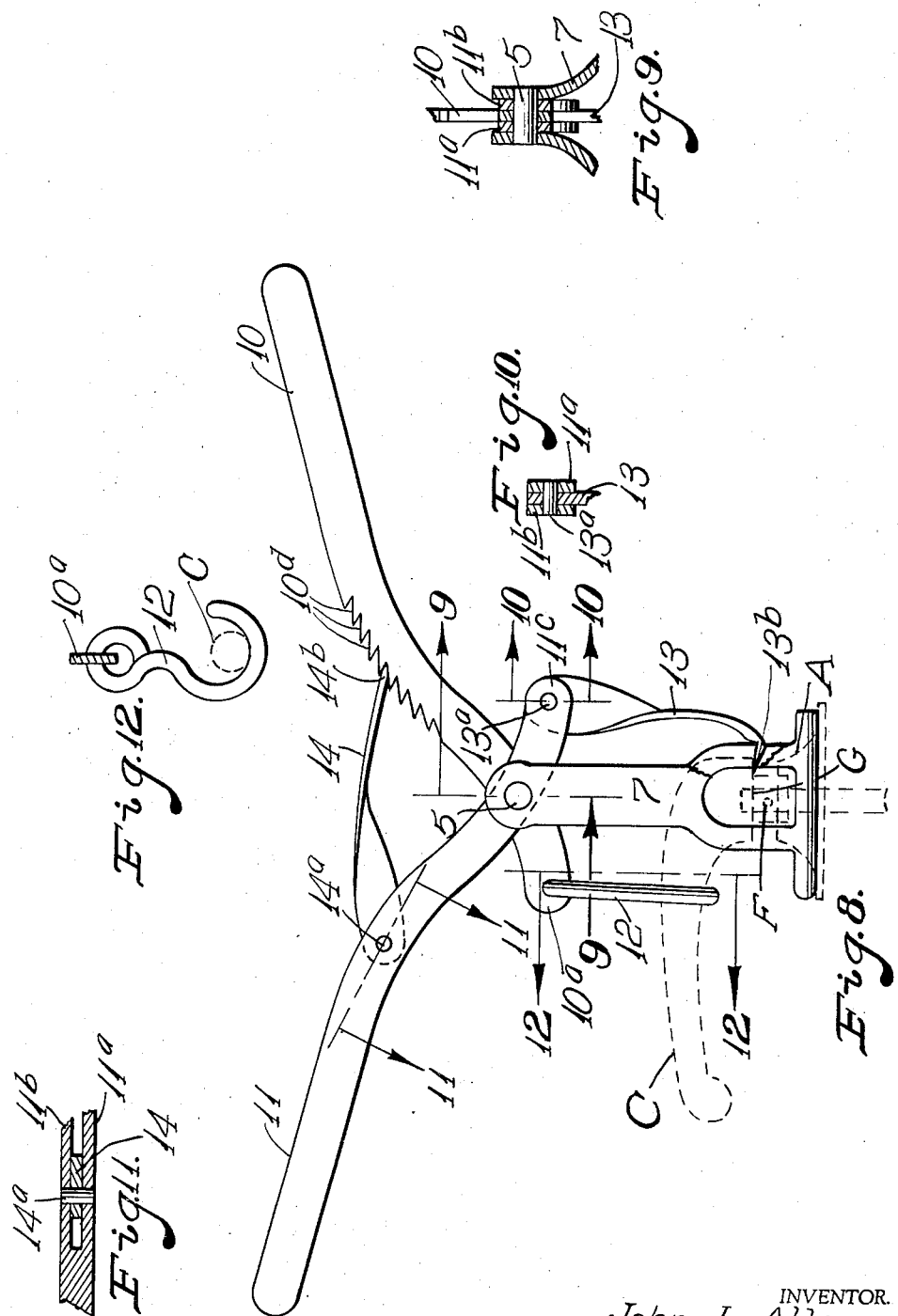

2,252,797

UNITED STATES PATENT OFFICE 2,252,797

AUTOMOBILE DOOR HANDLE REMOVER

John L. Allen, San Diego, Calif.

Application May 7, 1940, Serial No. 333,787

11 Claims. (Cl. 254—131)

My invention relates to an automobile door handle remover more particularly for use in removing door handles from the inner sides of automobile doors for upholstery and like repairs and the objects of my invention are:

First, to provide an automobile door handle remover of this class which facilitates the removal of door handles which are engaged and surrounded by panel shields under compression spring engaged relation with automobile door upholstery panels.

Second, to provide an automobile door handle remover of this class which is arranged to depress automobile inner door handle shields inwardly thereby exposing the handle fastening pin and is arranged to hold said shields in depressed relation while the operator removes said handle fastening pin from said door handle;

Third, to provide an automobile door handle remover of this class which is provided with latch means for holding the door handle and the shield in spaced relation permitting the operator to use both hands in the task of removing the door handle fastening pin from the door handle and its connecting mechanism;

Fourth, to provide an automobile door handle remover of this class which is applicable to various automobile door inner handles now in use;

Fifth, to provide an automobile door handle remover of this class which is easily and quickly applicable to automobile door inner handles and very simple and easy to operate;

Sixth, to provide an automobile door inner handle remover of this class which does not mar or injure the door handle or the surrounding parts when removing said door handle; and Seventh, to provide an automobile door handle remover of this class which is very simple and economical of construction, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of my automobile door handle remover showing diagrammatically by dash lines an automobile door handle and a door handle shield together with an upholstery panel and a compression spring in operative relation with the shield, my automobile door handle remover being shown applied to the door handle and shield for removing said door handle; Fig. 2 is a sectional view taken from the line 2—2 of Fig. 1 showing by dash lines the relation of the door handle shield and connection parts with the shield depressing member of my automobile door handle remover; Fig. 3 is a sectional view taken from the line 3—3 of Fig. 1; Fig. 4 is a sectional view taken from the line 4—4 of Fig. 1; Fig. 5 is a fragmentary elevational view taken from the line 5—5 of Fig. 1; Fig. 6 is a fragmentary side elevational view showing a modification of my automobile door handle remover; Fig. 7 is a fragmentary sectional view taken from the line 7—7 of Fig. 6; Fig. 8 is a fragmentary side elevational view showing another modification of my automobile door handle remover showing by dash lines an automobile door handle and door handle shield in connection therewith; Fig. 9 is a fragmentary sectional view taken from the line 9—9 of Fig. 8 showing a part in elevation to facilitate the illustration; Fig. 10 is a fragmentary sectional view taken from the line 10—10 of Fig. 8 showing a part in elevation to facilitate the illustration; Figure 11 is a fragmentary sectional view taken from the line 11—11 of Fig. 8 showing a part in elevation to facilitate the illustration and Fig. 12 is a sectional view taken from the line 12—12 of Fig. 8 showing by dash lines the cross sectional shape of an automobile door handle in connection with the hook member of my modified automobile door handle remover.

Similar characters of reference refer to similar parts and portions throughout the several views of the drawings:

The shield depressing member 1, operating lever 2, door handle engaging member 3, and the latch member 4 constitute the principal parts and portions of my automobile door handle remover.

The shield depressing member 1 is provided with a substantially U-shaped door handle shield engaging portion 1a which is arranged to be positioned around the outer edge of the door handle shield A, as shown by dash lines in Fig. 2 of the drawings, and surrounding the door handle shank portion B, also shown by dash lines in Fig. 2 of the drawings. This shield depressing member 1 is also provided with two leg members 1b, as shown best in Figs. 1 and 3 of the drawings and each of these leg members 1b are bifurcated forming bifurcated portions 1c. These bifurcated portions 1c are secured on the shield engaging portion 1a by welding or otherwise, or may be integral therewith, as shown best in Figs. 1, 2 and 3 of the drawings. Each of these leg portions 1b are curved inwardly at their opposite ends from the bifurcated portions 1c and are provided with openings 1d therein in which the pin 5 is positioned.

Pivotally mounted on this pin 5 is the operating lever 2, as shown best in Figs. 1 and 3 of the drawings. This operating lever 2 is provided with an extending handle portion 2a and a flattened portion 2b intermediate said handle portion 2a and the pin 5, as shown best in Figs. 1 and 5 of the drawings. Positioned in one edge of this flattened portion 2b are notch portions 2c which are arranged to be engaged by the U-shaped portion 4a of the latch member 4, as shown best in Fig. 5 of the drawings.

It will be noted that the opposite ends 4b of the latch members 4 are positioned in the openings 1e in the leg members 1b, as shown best in Figs. 1 and 3 of the drawings.

Positioned in the extending portion 2d of the operating lever 2 is a bolt 6 on which the door handle engaging member 3 is pivotally mounted, as shown best in Figs. 1 and 4 of the drawings. This door handle engaging member 3 is substantially hook shaped, as shown in Fig. 4 of the drawings and is arranged to be positioned on the inner side of the automobile door handle C, as shown by dash lines in Fig. 3 of the drawings.

The operation of my automobile door handle remover is substantially as follows:

The U-shaped shield engaging portion 1a of the shield depressing member 1 is positioned over the outer extending portion of the shield A as shown in Fig. 2 of the drawings and the automobile door handle C, as shown in Figs. 1 and 3 by dash lines, is engaged by the hook portion 3a of the door handle engaging member 3. It will be noted that the shield A, as shown in Fig. 1 by dash lines, engages the outer surface of the upholstery panel D, also shown by dash lines and that the compression spring E is positioned behind the upholstery panel D and is arranged to force the door handle shield A outwardly over the shank portion B of the door handle C. The door handle fastening pin F, as shown by dash lines in Fig. 1 of the drawings, is so arranged that the door handle shield A is positioned thereover when the spring E forces the door panel D together with the shield A outwardly into normal position adjacent the shoulder portion G of the door handle C. Therefore, the door handle shield A must be depressed inwardly so that the door handle fastening pin F is exposed permitting it to be removed from the shank portion B and releasing it from the bolt H, all as shown by dash lines in Figs. 1 and 2 of the drawings. When the shield engaging portion 1a of the shield depressing member 1 is in the position as shown in Fig. 1 of the drawings, the door handle engaging member 3 is in engagement with the door handle C, as shown in Fig. 3 of the drawings, the handle portion 2a of the operating lever 2 is shifted inwardly toward the upholstered door panel D pivoting the operating lever 2 on the pin 5 and forcing the shield engaging portion 1a inwardly by means of the secure relation of the hook portion 3a of the handle engaging members 3 with the door handle C. The U-shaped portion 4a of the latch member 4 is positioned in one of the slotted portions 2c in the flattened portion 2b of the operating lever 2 preventing the pivotal movement of the operating member 2 on the pin 5 and holding the door handle C in spaced relation with the door handle shield A by means of the door handle engaging member 3 in connection with the operating lever 2 and the shield depressing member 1 in rigid connected relation with the operating lever 2, all as shown in Fig. 1 of the drawings. It will be noted that when the door handle C and the door handle shield A are held in spaced relation to each other, as shown in Fig. 1 of the drawings, the door handle fastening pin F is exposed and a suitable tool is readily inserted between the bifurcated portions 1c of the leg members 1b for forcing the pin F out of engagement with the shank portion B of the door handle C and the bolt H in connection therewith.

The modification, as shown in Figs. 6 and 7, provides a structure wherein the shield depressing member 7 is constructed and operated in substantially the same way as the shield depressing member 1 as hereinbefore described except that the holes 1e therein are omitted. The operating lever 8 is pivotally mounted on said shield depressing member 7 at its one end 8a and pivotally mounted thereon is the door handle engaging member 9 which is constructed and operated substantially the same way as the handle engaging member 3 as hereinbefore described, it being noted that the operating lever 8 is pulled outwardly as indicated by the arrow J in Fig. 6 of the drawings when it is desired to depress the door handle shield A as hereinbefore described. The handle engaging member 9 of the modification being mounted on the opposite side of the fulcrum of the operating lever 8 from that hereinbefore described, provides reversed action of the operating lever 8 of the modification for a corresponding operation to that hereinbefore described in connection with the structure disclosed in Fig. 1 of the drawings.

In the modification, as shown in Fig. 8 of the drawings, I have provided a shield depressing member 7 which is substantially of the same construction described in connection with the modification, as shown in Fig. 6 of the drawings. Pivotally mounted on the pin 5, as shown in Fig. 8 of the drawings are two operating levers 10 and 11, the operating lever 11 being bifurcated as shown in Fig. 11 of the drawings and the operating lever 10 being positioned between the bifurcated portion 11a and 11b of the operating lever 11, as shown best in Fig. 9 of the drawings. It will be noted that the ends of these operating levers 10 and 11 are positioned in cross relation on the pin 5 which is supported in the shield depressing member 7, as hereinbefore described in connection with the shield depressing member 1, as shown in Fig. 1 of the drawings. Pivotally mounted in the extending end 10a of the operating lever 10 is the hook member 12 which is arranged to engage the automobile door handle, as shown by dash line C, as shown best in Fig. 12 of the drawings. Secured in the extended ends 11c of the operating lever 11 between the bifurcated portions 11a and 11b is the door handle engaging member 13. This door handle engaging member 13 is pivotally mounted on the pin 13a which is positioned in the bifurcated portions 11a and 11b of the operating lever 11, as shown best in Fig. 10 of the drawings. This door handle engaging member 13 is provided with a relatively sharp hook portion 13b which is arranged to engage the shoulder portion G of the door handle C, as shown by dash lines in Fig. 8 of the drawings. The latch member 14 is pivotally mounted on the pin 14a and is positioned between the bifurcated portions 11a and 11b of the operating lever 11, as shown best in Fig. 11 of the drawings. The extending end portion 14b of this latch member 14 is arranged to engage notch portions 10d in the one side of the operating lever 10, as shown best in Fig. 8 of the drawings.

It will be noted that the shield depressing member 7 is operated in substantially the same way in connection with the automobile door handle and door handle shield, as is the shield depressing member 1 as shown in Fig. 1 of the drawings. The hook member 12 is arranged to operate the same way as the hook member 3 as described in connection with the structure as shown in Fig. 1 of the drawings. When removing an automobile door handle C with the modified structure, as shown in Fig. 8 of the drawings, the hook member 12 is positioned around the inner side of the door handle C and the hook portion 13b of the door handle engaging member 13 is positioned beneath the shoulder portion G after the door handle shield A has been depressed slightly by the pivotal movement of the lever 10 in connection with the shield depressing member 1 and the hook member 12 engaging the door handle C. After this hook portion 13b of the door handle engaging member 13 has been placed beneath the shoulder portion G of the door handle C, both the operating levers 10 and 11 are simultaneously pressed inwardly toward the shield depressing member 7 providing uniform engagement and application of force in connection with the door handle C for removing the same. It will be here noted that when the operating levers 10 and 11 are depressed to various degrees relatively with the shield engaging member 7 the end portion 14b of the latch member 14 engages one of the notch portions 10d in the operating lever 10 providing fixed relation of the operating levers 10 and 11 with the shield depressing member 7 for holding the door handle C in spaced relation with the door handle shield A so that the pin F may be readily removed.

Though I have shown and described a particular construction, combination and arrangement of parts and portions and certain modifications, I do not wish to be limited to the particular construction, combination and arrangement, nor to the modifications, but desire to include in the scope of my invention the construction, combination and arrangement substantially as set forth in the appended claims.

Having thus described my invention, what I claim as new and desire to secure by Letters Patent is:

1. In an automobile door handle remover of the class described, a shield depressing member, an operating lever pivotally mounted thereon and a door handle engaging member mounted on said operating lever at one side of the pivotal connection of said shield depressing member and said operating lever.

2. In an automobile door handle remover of the class described, a shield depressing member, an operating lever pivotally mounted thereon, a door handle engaging member mounted on said operating lever at one side of the pivotal connection of said shield depressing member and said operating lever, said shield depressing member provided with a substantially U-shaped shield engaging portion.

3. In an automobile door handle remover of the class described, a shield depressing member, an operating lever pivotally mounted thereon, a door handle engaging member mounted on said operating lever at one side of the pivotal connection of said shield depressing member and said operating lever, and latch means interconnecting said shield depressing member and said operating lever.

4. In an automobile door handle remover of the class described, a shield depressing member, an operating lever pivotally mounted thereon, a door handle engaging member mounted on said operating lever at one side of the pivotal connection of said shield depressing member and said operating lever, latch means interconnecting said shield depressing member and said operating lever, said shield depressing member provided with a substantially U-shaped shield engaging portion.

5. In an automobile door handle remover of the class described, a shield depressing member provided with a shield engaging portion, an operating lever pivotally mounted on said shield depressing member in spaced relation from said shield engaging portion and a handle engaging member mounted on said operating lever at one side of the pivotal connection of said operating lever with said shield depressing member.

6. In an automobile door handle remover of the class described, a shield depressing member provided with a shield engaging portion, an operating lever pivotally mounted on said shield depressing member in spaced relation from said shield engaging portion, a handle engaging member mounted on said operating lever at one side of th pivotal connection of said operating lever with said shield depressing member, said shield engaging portion substantially U-shaped.

7. In an automobile door handle remover of the class described, a shield depressing member provided with a shield engaging portion, an operating lever pivotally mounted on said shield depressing member in spaced relation from said shield engaging portions, a handle engaging member mounted on said operating lever at one side of the pivotal connection of said operating lever with said shield depressing member, said engaging portion being substantially U-shaped, said operating lever provided with notched portions therein spaced from said shield depressing member, and a latch member mounted in said shield depressing member and arranged to engage said notch portions in said operating lever.

8. In an automobile door handle remover of the class described, the combination of a shield depressing member, opposed operating levers pivotally mounted thereon and door handle engaging means on one of said levers at one side of said shield depressing member.

9. In an automobile door handle remover of the class described, the combination of a shield depressing member, opposed operating levers pivotally mounted thereon and door handle engaging means on one of said levers at one side of said shield depressing member, and a latch member interposed between said operating levers.

10. In an automobile door handle remover of the class described, the combination of a shield depressing member, opposed operating levers pivotally mounted thereon, door handle engaging means on one of said levers at one side of said shield depressing member, a latch member interposed between said operating levers, said latch member pivotally mounted on one of said operating levers.

11. In an automobile door handle remover of the class described, the combination of a shield depressing member, opposed operating levers pivotally mounted thereon, door handle engaging means on one of said levers at one side of said shield depressing member, a latch member interposed between said operating levers, said latch member pivotally mounted on one of said operating levers, the other operating lever provided with notched portions therein engageable with said latch member.

JOHN L. ALLEN.